Figure 1:
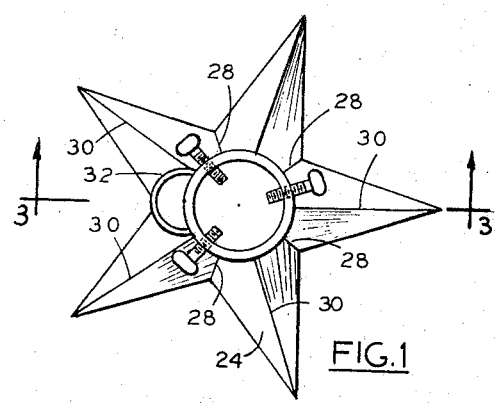

Aug. 22, 1967     I. H. GRIFFIN     3,337,169

TREE HOLDER

Filed March 2, 1965

INVENTOR.
IVAN H. GRIFFIN.

BY

ATTORNEY

United States Patent Office 3,337,169
Patented Aug. 22, 1967

3,337,169
TREE HOLDER
Ivan H. Griffin, 146 Dorwin Ave.,
Syracuse, N.Y. 13205
Filed Mar. 2, 1965, Ser. No. 436,475
4 Claims. (Cl. 248—44)

This invention relates to tree holders of the type employed for cut Christmas trees.

Tree holders adapted to support cut conifer or evergreen trees for Christmas display are often lacking in adequate facilities for keeping the tree fresh by watering, and in providing a base of sufficient included area as to safely support the tree. On the other hand holders of sufficient size to provide an adequate base, have been generally lacking in esthetic appeal.

The present invention is directed to a support for a cut tree which provides a relatively broad base area, has esthetic appeal, and in addition has adequate capacity for water, for the purpose of maintaining the tree fresh. More particularly the invention is directed to a holder having a star-shaped base, a collar disposed thereabove at a suitable elevation, and inclined planar side walls extending from the base to the collar, and providing a water reservoir, the base area of which is reduced by the star shape configuration to provide increased static height of such water as is contained therein for a given quantity thereof.

The above and other novel features of the invention will appear more fully hereinafter from the following detailed description when taken in conjunction with the accompanying drawings. It is expressly understood that the drawing are employed for purposes of illustration only and are not designed as a definition of the limits of the invention, reference being had for this purpose to the appended claims.

Figure 2:
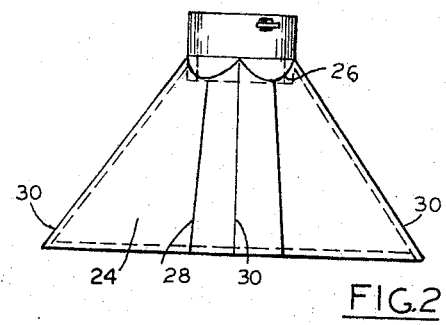
Figure 3:
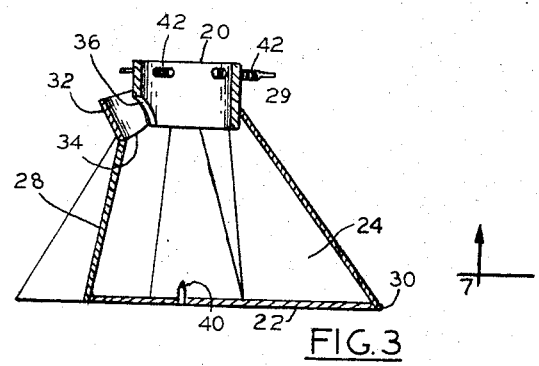
Figure 6:
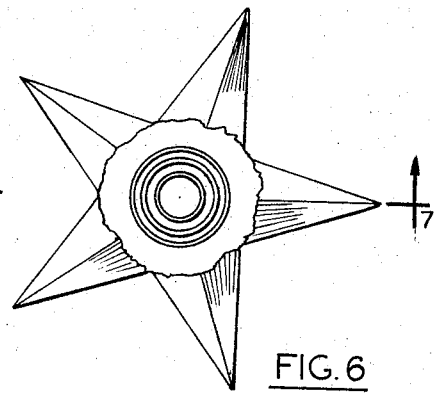
Figure 4:
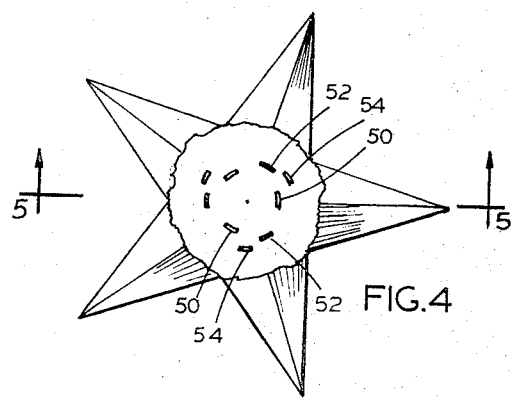
Figure 7:
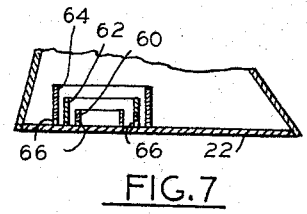
Figure 5:
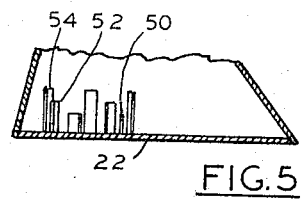

In the drawings, wherein like reference characters indicate like parts:

FIGURE 1 is a top plan view of the holder;
FIGURE 2 is a side elevation of the holder;
FIGURE 3 is a sectional view taken substantially on the line 3—3 of FIGURE 1;
FIGURE 4 is a plan view of a modified tree trunk butt socket the upper portion being broken away;
FIGURE 5 is a side elevation of the socket of FIGURE 4 taken from the broken section line 5—5 of FIGURE 4;
FIGURE 6 is a plan view of a further modified tree trunk butt socket; the upper portion being broken away; and
FIGURE 7 is a sectional view taken on the line 7—7 of FIGURE 6.

Referring to FIGURES 1, 2 and 3, there is shown a tree holder having a tubular collar 20, disposed above a base plate 22, of star configuration, the collar and plate being connected by sheet metal skirting 24 comprising a series of planar faces which extend from the marginal outline of the base plate 22 upwardly to the collar, where the skirting is scalloped as at 26 to provide a circular opening to receive the collar. The collar is welded or brazed to the scalloped edges of the skirting, as at 29 and the skirting may be welded or brazed to the base plate as at 30. The skirt can be formed of a single piece of metal, developed for folding along the valley lines 28 and intermediate lines 30, so as to require a single seam, or may be formed of as many sub-assemblies as desired. The construction is such as to form a water tight reservoir.

Laterally disposed with respect to the collar, and at the upper end of one of the valley lines 28 is a spout 32 which embraces an opening 34 in the upper end of the skirt, that is formed by cutting away a part of the skirt, and the collar 20 is similarly cut away as at 36, so that the spout 32 leading to the opening 34, is provided with free flow for filling the holder with water.

In the center of the bottom plate 22, there is provided a sharp prong 40, adapted to be readily projected into the center of the flat end of a tree trunk. The collar is provided with three threaded thumbscrews 42 which are adapted to engage the tree trunk, and which by adjustment enables a tree, pinned on the prong 40, to be brought to a vertical position.

It will be seen that, by reason of the star-shaped base, the actual area of the base plate is reduced or contracted such that a given quantity of water supplied to the holder will be maintained at a substantially higher level within the holder. It further will be seen that the points of the base plate, being extended radially, a substantial distance from the center of the holder, provide great stability while the configuration provides a water capacity which is not only adequate for an entire season, but of sufficient weight to add to the stability, without rendering the holder unwieldy.

In FIGURES 4 and 5 there is shown alternate butt end centering means for accommodating tree trunks of different sizes. For example the short upstanding lugs 50 affixed to the base are adapted to embrace a tree trunk of a diameter approximately that of the diameter of the circle on which said lugs are disposed, and thus hold the tree trunk butt centered. In the same manner, the longer lugs 52 disposed on a circle of slightly greater diameter would accommodate a larger tree trunk butt end, while lugs 54 would accommodate and center a trunk of still greater diameter. In FIGURES 6 and 7 socket forming sleeves 60, 62 and 64 are employed, the inner sleeve 60 being of less height than the intermediate sleeve 60, and the intermediate sleeve 62 being of less height than the sleeve 64. Where sleeves are employed one or more lateral ports 66 adjacent the base 22 are provided to allow water to freely flow into the sleeves so as to keep the butt end of the tree trunk watered, even though the water level should recede below the level of the upper rim of the outer sleeve.

In practice, a base having five points as shown affords great stability. Increasing the number of points to six, even though the points be of the same radius as a five point base, results in a base of less stability, and while a star shape of a still greater number of points, if odd in number, will increase the stability slightly, little advantage is gained, and the esthetic appearance is diminished. Thus in practice, and for reasons of economy, and to obtain great stability, a five point base is preferred.

While the construction has been described as of metal, with the various seams and joints brazed or welded, as desired, it will of course appear that the stand, particularly in smaller sizes, could as readily be formed of plastics, ceramics, impregnated fibers, or other materials, or a combination of materials. The appearance of the holder is further enhanced when finished in green or other color or design in keeping with the Christmas motif. Since the collar loosely fits the average tree trunk, allowing space for filling the base with water, the spout may be eliminated, if desired.

While a single form of the invention has been illustrated and described with minor variations, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A tree holder comprising a star-shaped base plate having a marginal edge of star-shaped configuration having at least five points and intermediate angular recesses, a collar disposed above said plate, and planar skirting connecting the marginal edge of the base along the entire perimeter and sloping upwardly and inwardly and terminating at and affixed to the exterior of said collar, said skirting having rigidifying valley folds and intermediate folds extending upwardly from the angular recesses and points of the marginal edge configuration of the base plate to the collar, said base plate fixing the angles of said folds, means affixed to the base plate for centering and holding the butt end of a tree trunk with respect to the base plate, and means associated with the collar to fix, and locate the position of a tree trunk extending therethrough, said skirt having a water fill spout affixed to the skirting in the upper end of a valley fold adjacent the collar, said base and skirting forming a water tight chamber, the lower cross-sectional area of which is substantially less than the area of a circle circumscribing the base plate, whereby to raise the level of a given quantity of water supplied to the chamber.

2. A tree holder as set forth in claim 1, wherein the centering means comprises a plurality of concentrate circular sleeves affixed to the base plate each inner sleeve being of less height than the adjacent sleeve radially outward thereof, said sleeves having a port therein adjacent the base plate.

3. A tree holder as set forth in claim 1 wherein the centering means comprises a plurality of spaced upstanding lugs affixed to the base plate on concentric circles, the lugs disposed on an inner circle being of less height than the lugs on the adjacent circle radially outward thereof.

4. A tree holder as set forth in claim 1, wherein the centering means comprises a short upstanding sharp prong affixed to the center of the base plate.

References Cited

UNITED STATES PATENTS

| | | | |
|---|---|---|---|
| 558,433 | 4/1896 | Stoddard | 248—44 X |
| 1,846,891 | 2/1932 | Miller | 248—44 |
| 2,044,192 | 6/1936 | Templin | 248—44 |
| 2,928,633 | 3/1960 | Holmes et al. | 248—44 |
| 2,963,256 | 12/1960 | Borah | 248—346 |

FOREIGN PATENTS 158,378    4/1940    Germany.

JOHN PETO, *Primary Examiner.*

CLAUDE A. LE ROY, *Examiner.*